(12) United States Patent
Holec et al.

(10) Patent No.: US 6,446,832 B1
(45) Date of Patent: Sep. 10, 2002

(54) VIRTUAL MULTIHOPPER CARD FEEDER

(75) Inventors: Henry V. Holec, Mendota Heights; Cory Dean Wooldridge, Brooklyn Park; Gary Paul Mattila, Excelsior; Jeffrey J. Rust, Brooklyn Park, all of MN (US)

(73) Assignee: Datacard Corporation, Minneapolis, MN (US)

( * ) Notice: Subject to any disclaimer, the term of this patent is extended or adjusted under 35 U.S.C. 154(b) by 0 days.

(21) Appl. No.: 09/049,250

(22) Filed: Mar. 27, 1998

(51) Int. Cl.[7] ................................................ G07F 11/42
(52) U.S. Cl. .............................. 221/88; 221/9; 221/79; 221/80; 221/7
(58) Field of Search ............................. 221/88, 7, 9, 13, 221/67, 79, 80, 81, 87; 235/475, 479, 379, 380, 381

(56) References Cited

U.S. PATENT DOCUMENTS

| | | | | |
|---|---|---|---|---|
| 2,194,828 A | * | 3/1940 | Greaves | 221/71 |
| 3,034,643 A | * | 5/1962 | Keller et al. | 209/583 |
| 3,483,361 A | | 12/1969 | Blurton | |
| 3,531,106 A | | 9/1970 | Larson et al. | |
| 3,679,876 A | * | 7/1972 | Faith et al. | 235/61.7 |

(List continued on next page.)

FOREIGN PATENT DOCUMENTS

| | | |
|---|---|---|
| JP | 2-24777 | 1/1990 |
| JP | 63-171848 | 1/1990 |
| JP | 63-267653 | 4/1990 |
| JP | 2-230391 | 9/1990 |
| JP | 4-24895 | 1/1992 |
| JP | 7-160790 | 6/1995 |
| JP | 7-210730 | 8/1995 |
| JP | 8-016894 | 1/1996 |
| JP | 8-106555 | 4/1996 |
| JP | 8-255227 | 10/1996 |
| JP | 8-329321 | 12/1996 |
| JP | 9-102018 | 4/1997 |
| JP | 9-138879 | 5/1997 |
| JP | 9-223171 | 8/1997 |
| WO | WO 86/04170 | 7/1986 |
| WO | WO 92/17856 | 10/1992 |

OTHER PUBLICATIONS

1992 Rommi, Report on Man/Machine Interfaces, The Ultimate EFT Battleground, 2 pages of article.
Undated *American Express "Express Card Teller"* brochure, 1 page.

*Primary Examiner*—Christopher P. Ellis
*Assistant Examiner*—Patrick Mackey
(74) *Attorney, Agent, or Firm*—Merchant & Gould, P.C.

(57) ABSTRACT

An improved card feeding apparatus and associated method for feeding plastic cards to a printer. The apparatus can be used in any system where plastic cards are fed into a printer, but has particular use in a self-service, automated card issuance kiosk. The apparatus includes a support structure, and a card cassette is mounted on the support structure for holding a plurality of cards. The card cassette is moveable relative to the support structure, with the card cassette defining a discrete position for each card. A card picker is mounted on the support structure, with the card picker being capable of picking any one of the plurality of cards from the card cassette. Since each card has a discrete position within the card cassette, the card cassette can be moved past the card picker and any one of the cards within the card cassette can be picked by the card picker, and subsequently fed to a printer to personalize the card.

8 Claims, 6 Drawing Sheets

U.S. PATENT DOCUMENTS

| | | | |
|---|---|---|---|
| 3,757,944 A | * 9/1973 | Goodman | 235/612 |
| 3,775,593 A | 11/1973 | Gieringer et al. | |
| 3,819,088 A | * 6/1974 | Guigan | 221/224 |
| 3,888,365 A | * 6/1975 | Reilmann et al. | 414/266 |
| 4,375,856 A | * 3/1983 | Chappot | 221/68 X |
| 4,385,285 A | 5/1983 | Horst et al. | |
| 4,429,217 A | 1/1984 | Hill et al. | |
| 4,593,183 A | 6/1986 | Fukatsu | |
| 4,641,239 A | 2/1987 | Takesako | |
| 4,650,977 A | 3/1987 | Couch | |
| 4,659,082 A | * 4/1987 | Greenberg | 273/149 R |
| 4,778,982 A | 10/1988 | Beech et al. | |
| 4,794,530 A | 12/1988 | Yukiura et al. | |
| 4,818,854 A | 4/1989 | Davies et al. | |
| 4,825,054 A | 4/1989 | Rust et al. | |
| 4,866,259 A | 9/1989 | Bonnemoy | |
| 4,884,212 A | 11/1989 | Stutsman | |
| 4,965,438 A | 10/1990 | Murofushi | |
| 4,968,873 A | 11/1990 | Dethloff et al. | |
| 4,970,655 A | 11/1990 | Winn et al. | |
| 5,009,332 A | * 4/1991 | Sannel et al. | 271/303 X |
| 5,009,411 A | * 4/1991 | Manderfeld et al. | 271/129 |
| 5,010,485 A | 4/1991 | Bigari | |
| 5,036,472 A | 7/1991 | Buckley et al. | |
| 5,146,067 A | 9/1992 | Sloan et al. | |
| 5,176,237 A | 1/1993 | Yang | |
| 5,266,781 A | * 11/1993 | Roblejo | 273/149 R |
| 5,268,821 A | * 12/1993 | Wong | 361/796 |
| 5,350,906 A | 9/1994 | Brody et al. | |
| 5,378,884 A | 1/1995 | Lundstrom et al. | |
| 5,614,707 A | * 3/1997 | Lundstrom et al. | 235/479 |
| 5,615,123 A | 3/1997 | Davidson et al. | |
| 5,637,845 A | 6/1997 | Kolls | |
| 5,673,309 A | 9/1997 | Woynoski et al. | |
| 5,696,908 A | 12/1997 | Muehlberger et al. | |
| 5,710,637 A | 1/1998 | Matsumoto | |
| 5,814,796 A | 9/1998 | Benson et al. | |
| 5,989,122 A | * 11/1999 | Roblejo | 463/22 |

* cited by examiner

VIRTUAL MULTIHOPPER CARD FEEDER

FIELD OF THE INVENTION

The present invention relates to the handling of plastic cards, such as credit cards, identification cards and the like. More particularly, the present invention relates to an apparatus and method for feeding plastic cards into a printer.

BACKGROUND OF THE INVENTION

Plastic cards are widely used to form credit cards, identification cards and the like. The plastic cards are produced having a large variety of designs, logos and colors unique to the particular issuer of the card. For instance a bank that issues credit cards will often times have its logo printed on the cards, as well as issuing different types of cards such as gold credit cards, platinum credit cards, etc. The cards are generally run through a printer which prints and/or embosses customer specific information, such as names, addresses, identification numbers and the like, on the cards.

It is expected that self-service, automated card issuance kiosks or stations will come into widespread use. The card issuance kiosks, which are similar to automated teller machines (ATM's), will allow a customer to chose a particular type of card from a variety of available cards, and then issue the selected card with the card personalized for the particular customer. The kiosks must be able to hold a variety of different cards to allow a wide selection for the customer, as well as being able to take the selected card and feed it to a printer for printing and/or embossing of the customer specific information thereon. However, since the kiosks are self-service and unattended, the reliability and security of card issuance kiosks is a concern.

SUMMARY OF THE INVENTION

The present invention provides an improved card feeding apparatus, and a method for feeding plastic cards to a printer, that can be used in any system where plastic cards are fed into a printer, but has particular use in a card issuance kiosk system. The card feeding apparatus and method of the present invention is designed to simplify the feeding of the card to the printer, as well as to increase the reliability of the card feed operation, while providing increased security.

In one embodiment of the present invention, a multihopper card feeder is provided including a support structure, and a card cassette mounted on the support structure for holding a plurality of cards. The card cassette is moveable relative to the support structure, and the card cassette defines a discrete position for each card of the plurality of cards. A card picker is mounted on the support structure, with the card picker being capable of picking any one of the plurality of cards from the card cassette. Thus, since each card has a discrete position within the card cassette, the card cassette can be moved past the card picker and any one of the cards within the card cassette can be picked by the card picker, and subsequently fed to a printer to personalize the card.

In another embodiment of the present invention, an apparatus for holding a plurality of cards and feeding the cards to a printer is provided. The apparatus includes a support structure connected to the printer, and a card cassette mounted on the support structure. The card cassette is moveable relative to the support structure, and the card cassette defines a discrete position for each card of the plurality of cards. A card picker is mounted on the support structure for picking any one of the plurality of cards from the card cassette. Feed rollers engage each card picked by the card picker for feeding each picked card to the printer.

In yet another embodiment of the present invention, a card cassette for holding a plurality of cards in a card feeder is provided, including first and second spaced apart plates, with each plate including a plurality of spaced grooves defined therein. The grooves in the first plate face the grooves in the second plate, and the grooves in the first and second plates are aligned with each other whereby a plurality of discrete card positions are defined by the aligned grooves. Thus, by utilizing spaced grooves in the plates, the cards within the card cassette are not only held at discrete positions, but the cards are also spaced apart from each other to facilitate picking of the desired card.

A process for feeding cards into a printer is also provided. The process includes loading a plurality of the cards into a cassette, with each card having a discrete position. The cassette is then loaded into the printer, and the position of each card in the cassette is mapped out thereby creating an inventory map. Thereafter, a selected one of the plurality of cards is picked from the cassette, and the picked card is then fed to the printer. By creating an inventory map of the cards within the cassette, the location of the cards, as well as the number of cards in the cassette, can be determined and a record thereof stored, to facilitate card picking and increase security.

These and various other advantages and features of novelty which characterize the invention are pointed out with particularity in the claims annexed hereto and forming a part hereof. However, for a better understanding of the invention, its advantages and objects attained by its use, reference should be made to the drawings which form a further part hereof, and to the accompanying description, in which there is described a preferred embodiment of the invention.

DETAILED DESCRIPTION OF THE PREFERRED EMBODIMENT

With reference to FIGS. 1–4, the virtual multihopper card feeder in accordance with the present invention is shown in detail and referenced by the numeral 10. As is shown diagrammatically in FIG. 5, the card feeder 10 is used in combination with a printer 12 so as to feed plastic cards 14 which can be blank; preprinted or pre-embossed to the printer for subsequent printing and/or embossing operations by the printer. The printer 12 can be any type of printer that is currently used to perform printing and/or embossing operations on plastic cards. The card feeder 10 is described herein as being used in connection with a self-service, automated card issuance kiosk, however it should be realized that the card feeder 10 could be used in any system where plastic cards are fed to a printer.

As shown in FIGS. 1–4, the card feeder 10 includes a stationary support structure 16 which is preferably attached to the printer 12 in any suitable manner so as to be stationary relative thereto. The support structure 16 includes a base plate 18, end plates 20a,20b extending upward from the base plate 18, and a side plate 22 extending upward from the base plate between the two end plates 20a,b.

Figure 1:
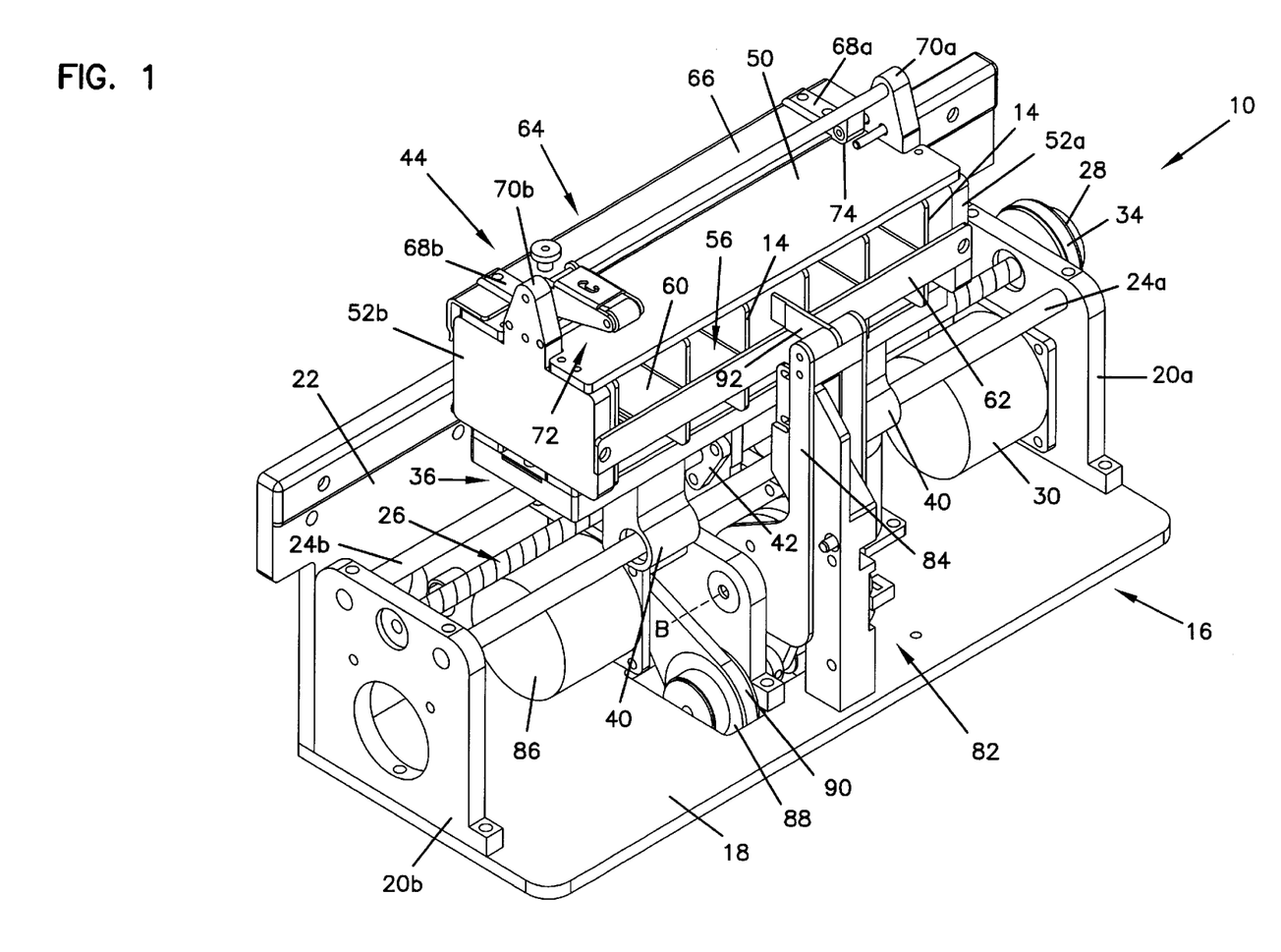
FIG. 1 is a perspective view of the multihopper card feeder in accordance with the present invention.

A pair of stationary guide rods 24a,24b extend between the end plates 20a,b, and a threaded screw shaft 26 is rotatably mounted at each of its ends in the end plates 20a,b between the two guide rods 24a,b. One end of the screw shaft 26 extends through the end plate 20a and has attached thereto a pulley 28. A stepper motor 30 is mounted on the end plate 20a and has a drive pulley 32 connected thereto, with a drive belt 34 extending around the pulleys 28,32 enabling rotation of the screw shaft 26 by the stepper motor 30.

A carriage 36 is moveably mounted on the support structure 16 for actuation by the stepper motor 30. The carriage 36 includes a support block 38 having first and second pairs of slide bearings 40 extending downward from the support block 38 and slideably disposed on the guide rods 24a,b so as to guide the movements of the support block 38. Only the pair of slide bearings 40 disposed on the guide rod 24a are visible in FIG. 1, it being understood that a corresponding pair of slide bearings (not visible) are slideably disposed on the guide rod 24b. The support block 38 further includes a lead screw nut 42 connected to the bottom thereof and disposed around the screw shaft 26 for engagement with the external threads of the screw shaft 26, whereby as the screw shaft 26 is rotated by the stepper motor 30 in either direction, the support block 38 is driven along a linear path relative to the support structure 16 due to the engagement between the threads of the screw shaft and the threads of the lead screw nut 42, with the slide bearings 40 disposed on the guide rods 24a,b guiding and stabilizing the support block 38.

A card holding cassette 44 is detachably mounted on the support block 38 of the carriage 36 so as to move integrally with the carriage. As can be seen in dashed lines in FIG. 2, the support block includes a pair of locating pins 46 fixed thereto and extending upwardly from the top surface thereof, and the cassette 44 includes a locating hole (not shown) and a locating slot 47 (shown in FIG. 3) into which the locating pins 46 fit to thereby precisely mount the cassette onto the carriage, while permitting removal of the cassette from the carriage by lifting the cassette off of the support block 38.

Figure 2:
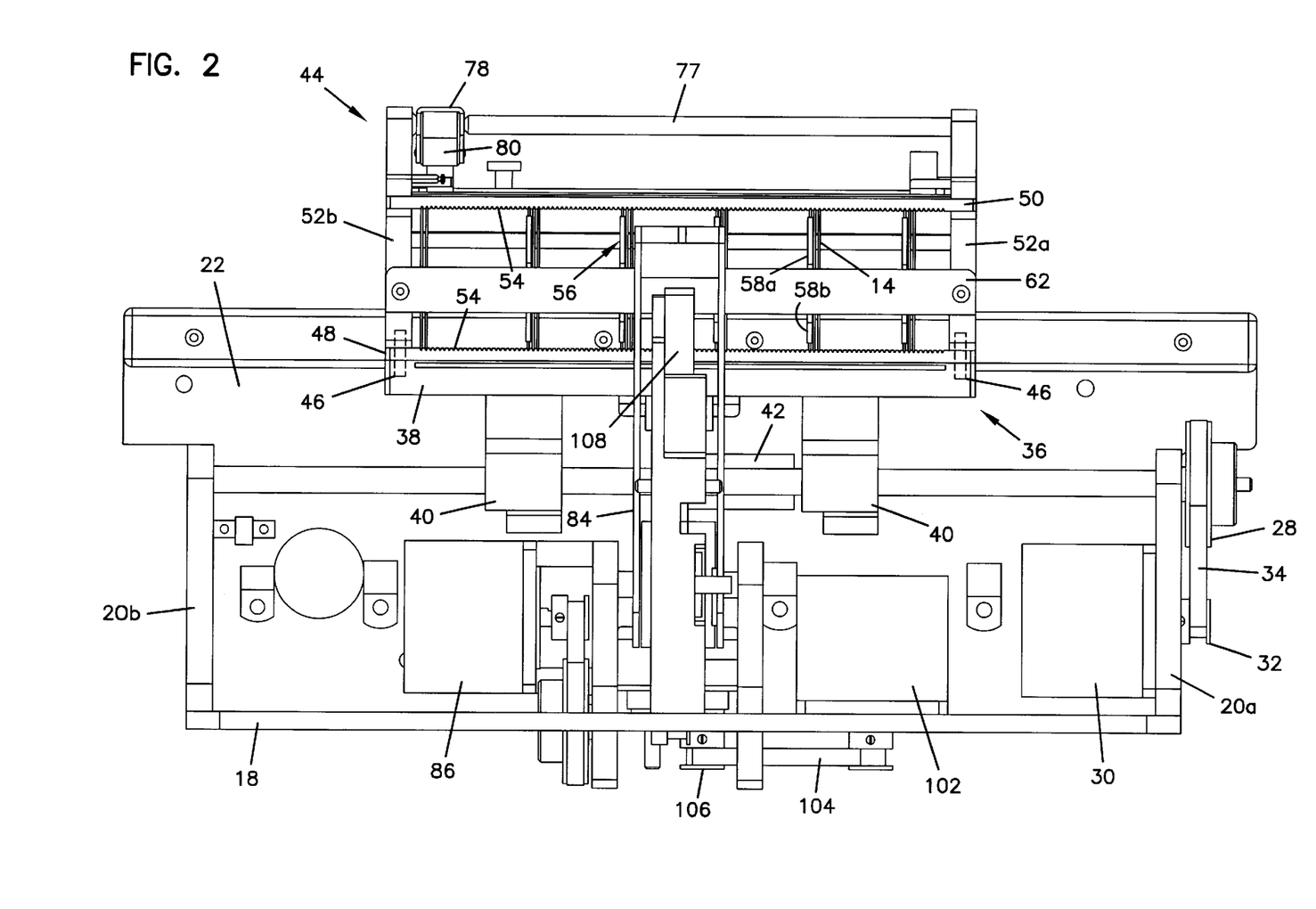
FIG. 2 is a side view of the multihopper card feeder.
Figure 3:
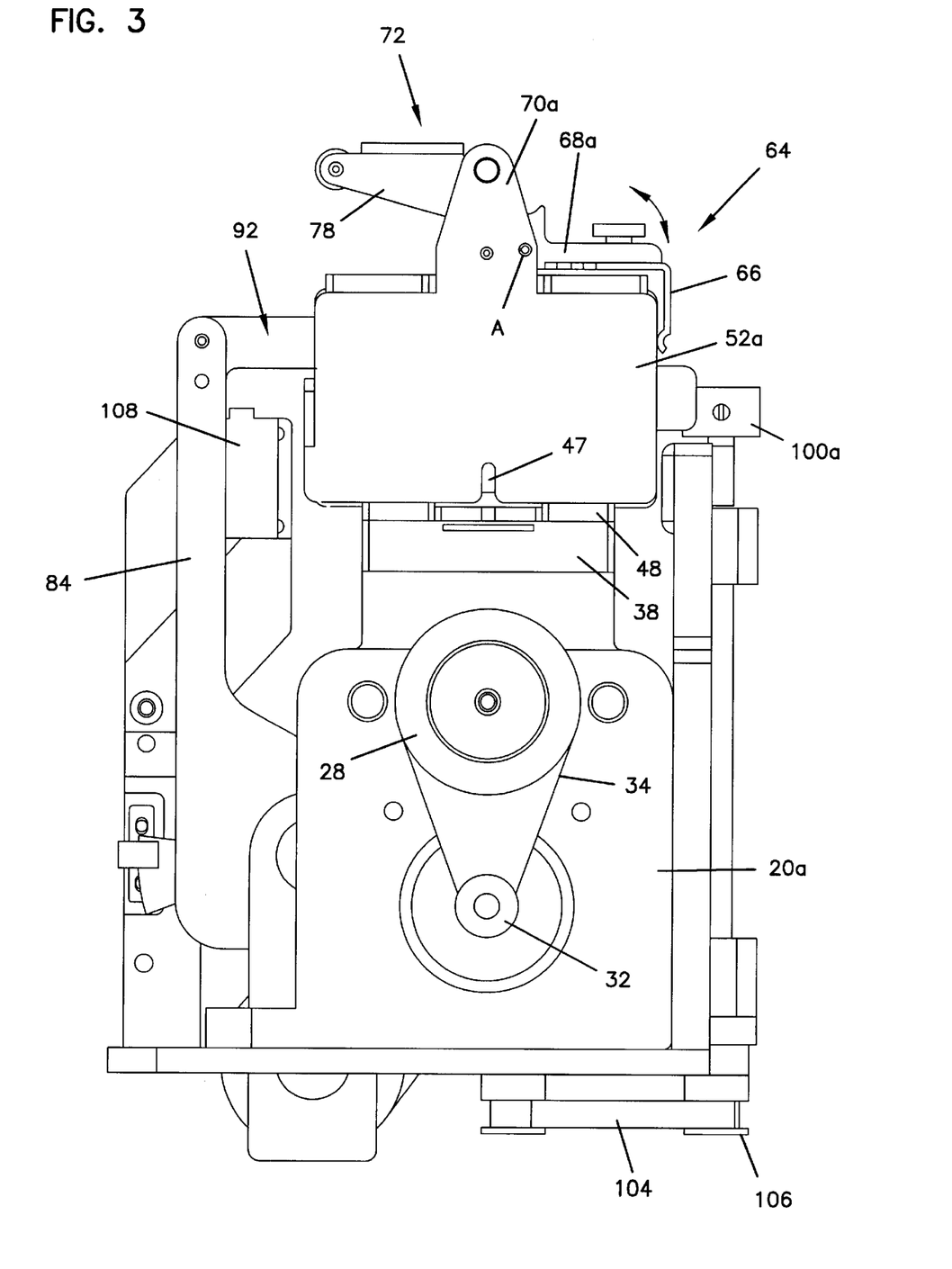
FIG. 3 is an end view of the multihopper card feeder.

The card holding cassette 44 includes a first, generally planar plate member 48 which is disposed upon the support block 38 of the carriage 36. A second, generally planar plate member 50 is spaced from the plate member 48 and is disposed parallel thereto, and a pair of end plates 52a,52b are connected to the plate members 48,50 adjacent the ends thereof to maintain the spacing of the plate members. The end plate 52a is formed with the locating slot 47, in order to receive one of the locating pins 46, while the opposite end plate 52b is formed with the locating hole which receives the other locating pin 46. In this manner the cassette 44 is precisely mounted onto the carriage 36, while being removable therefrom by lifting the cassette off of the support block 38. The plate members 48,50 and end plates 52a,b form a rectangular structure that is open at the sides, and the cards 14 are receivable within the rectangular structure.

With reference to FIG. 2, it is seen that the facing surfaces of the plate members 48,50 are each formed with a plurality of spaced grooves 54 extending transversely to the direction of movement of the carriage 36. The grooves 54 in the plate member 48 are aligned with the grooves 54 in the plate member 50, with the bottoms of the aligned grooves being spaced apart approximately equal to the width of the cards 14, and the grooves 54 having a thickness slightly greater than the thickness of the cards 14, such that the cards are slideably receivable within respective pairs of aligned grooves 54.

The card cassette 44 thus defines a discrete position for each card 14, with the cards 14 being spaced from each other by small gaps. Since the cards are spaced apart, card picking is made easier since there are no static frictional forces to overcome, nor is there the problem of card edges getting caught on adjacent cards edges. Previously, when plastic cards were simply stacked one on top of the other or side by side, a large static force occurred between the contacting faces of the card to be picked and the card next in line. In addition, the edges of the cards are sometimes rough and uneven, and therefore the edge of the card to be picked would catch on the edge of the card next in line. The static forces and the contacting edges increased the force that was required in order to pick a card, thereby increasing the difficulty of the card picking operation. The present invention also permits wider tolerances in the movements of the cards relative to the card picking mechanism, as well as larger tolerances in the thickness of the cards, since the cards do not have to be as finely positioned relative to the card picker compared with previous card stack arrangement, thereby increasing the reliability of the card feeder 10.

Further, by having a discrete position for each card 14, any one of the cards within the card cassette 44 can be picked. This allows many different types of cards 14 to be held within the card cassette, whereby the card cassette forms a multiple hopper for the cards. In previous multiple hopper systems, each separate hopper contains a stack of one type of card. Since the cards are stacked, only the end card of the stack is picked, with the resulting static forces and edge contact problems mentioned above. The card cassette 44 of the present invention allows the number of each type of card to be changed, as well as allowing the types of cards held to be changed, so that the card cassette 44 in effect forms a virtually unlimited number of hoppers. Any one of the cards 14 within the card cassette 44 can be picked, depending upon the type of card that is selected.

Returning to FIGS. 1 and 2, dividers 56 can be disposed within the card cassette,44 in order to separate the cards 14 into sections, with each section containing a single type of card. In one preferred arrangement, the dividers 56 are shaped like the cards 14, except that the dividers include top and bottom cut-outs 58a,58b that extend from one edge of the divider to approximately the middle of the divider, leaving a central portion 60 between the cut-outs 58a,b. The top and bottom edges of the dividers 56 are slideably received within respective aligned grooves 54, similarly to the cards 14, whereby the dividers 56 can be easily inserted and removed to allow the number of dividers to be altered, thereby altering the number of sections, or hoppers, defined in the card cassette 44. The cut-outs 58a,b allow a distinction to be made between the cards 14 and the dividers 56, thereby providing an indication of each separate card section as will be described in detail later in the description.

The card cassette 44 is further provided with a stop bar 62 on one side thereof that is connected at each of its ends to the end plates 52a,b such that the stop bar is located approximately midway between the plate members 48,50. The stop bar 62 contacts one end of the cards 14 to thereby prevent the cards from exiting the card cassette 44 through this side. As can be seen in FIGS. 1 and 2, the width of the stop bar 62 is approximately equal to the width of the central portion 60 of the dividers 56 such that the central portion 60 is essentially hidden behind the stop bar 62 when looking in the direction of FIG. 2.

The side of the card cassette 44 opposite the stop bar 62 includes a retractable gate mechanism 64 connected thereto for controlling ingress and egress of the cards 14 to and from the card cassette. As best seen in FIGS. 1 and 3, the gate mechanism 64 includes an L-shaped bar 66 that extends along the length of the card cassette 44, with the bar 66 including a vertical arm extending downward over the side of the card cassette so as to block the opposite ends of the cards and prevent the cards from exiting, and the bar 66 including a horizontal arm extending above the top surface of the plate member 50. The horizontal arm of the bar 66 is fastened to a pair of pivot brackets 68*a*,68*b* that are in turn pivotally connected to respective flanges 70*a*,70*b* extending upward from the end walls 52*a,b*, whereby the bar 66 can pivot about an axis A between a first position shown in FIG. 3 where the vertical arm blocks the cards 14 and a second position (not shown) in which the vertical arm of the bar 66 is removed from the side of the card cassette 44 and does not block the ends of the cards so that the cards can exit or enter the card cassette through the side.

Figure 4:
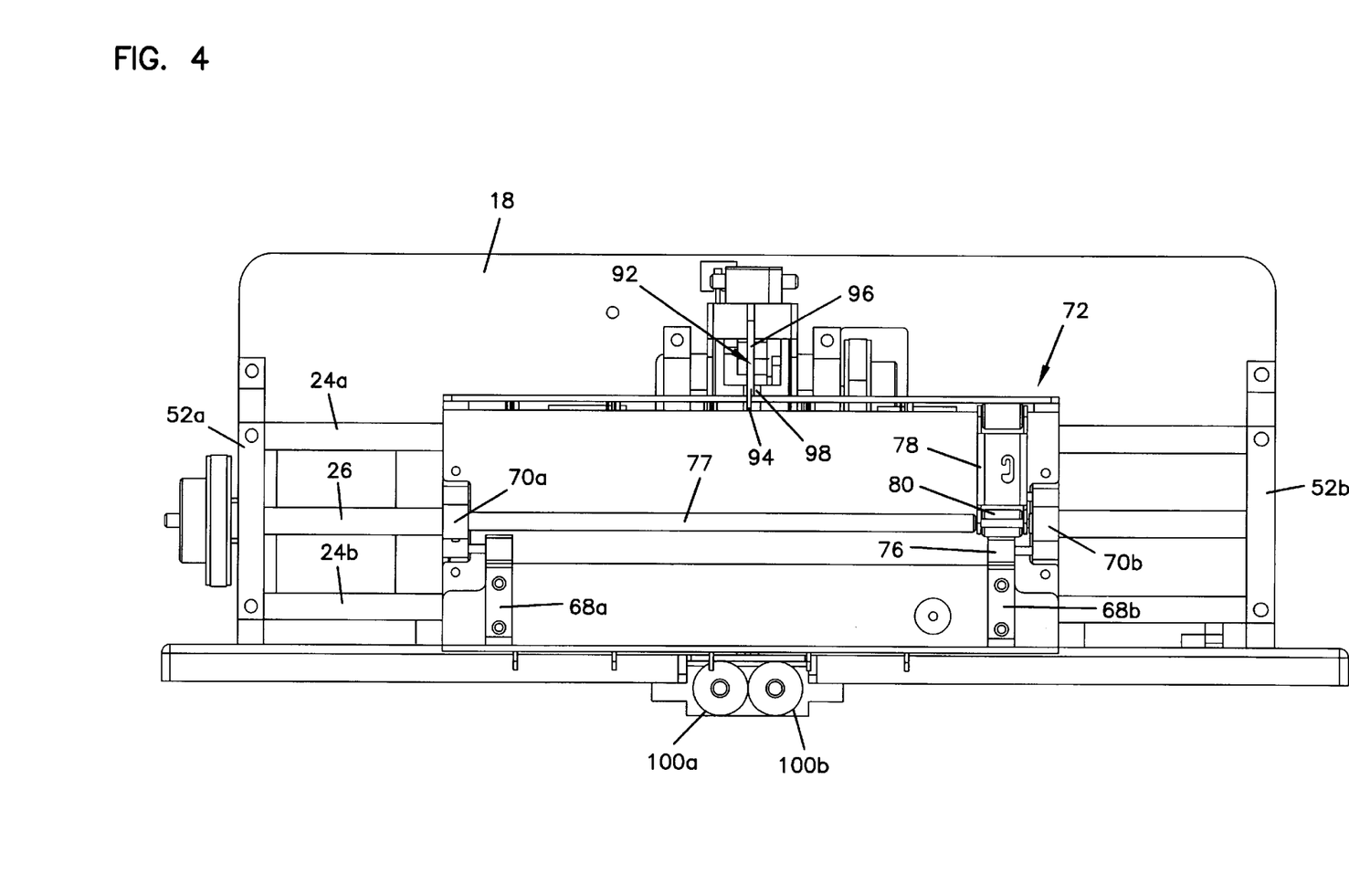
FIG. 4 is a top view of the multihopper card feeder.

The bar 66 is preferably manually actuated from the first position to the second position, and a locking mechanism 72 is provided to lock the bar at the second position. With reference to FIGS. 1 and 3–4, each of the pivot brackets 68*a,b* includes a rear boss portion 74 by which the respective pivot bracket is pivotally secured to the flanges 70*a,b*, and the boss portion 74 of the bracket 68*b* includes an upwardly facing, arcuate cam surface 76. Note that the rear boss portion 74 is eccentrically mounted, such that the cam surface 76 will move rearward as the bar 66 is pivoted to the second position. A stationary bar 77 extends between the flanges 70*a,b*, and a lever 78 is pivotally connected to the end of the bar 77 adjacent the pivot bracket 68*b*. A locking roller 80 is rotatably mounted on the lever 78 at the front end thereof and is disposed directly behind the boss portion, approximately at the level of the cam surface 76. The lever 78 is preferably spring loaded downward by a suitable biasing spring arrangement which helps to hold the L-shaped bar 66 in the closed position, as shown in FIG. 4, by positioning the roller 80 so that it engages against the back end of the cam surface 76. Since the roller 80 engages the back end of the cam surface 76, the L-shaped bar 66 is held closed until the bias of the spring is overcome.

Operation of the locking mechanism 72 is as follows. As the bar 66 is pivoted to the second position, the cam surface 76 pivots therewith and moves rearwardly due to the eccentric shape of the boss portion 74, against the bias of the spring on the lever 78, until the roller 80 is disposed in the arcuate cam surface 76. When the second position is finally reached, the locking roller 80 will be disposed completely in the arcuate cam surface, with the L-shaped bar 66 being locked at this position by the spring bias acting on the lever 78. In order to release the locking mechanism 72, the end of the lever 78 opposite the locking roller 80 must be pivoted upward so as to lift the locking roller 80 out of the cam surface 76, thereby allowing the bar 66 to freely pivot toward the first position. It should be noted that the bar 77 provides a convenient handle to facilitate mounting and/or removal of the card cassette 44 to and from the carriage 36, as well as facilitating carrying of the card cassette when transporting the cassette.

The card feeder 10 also includes a card picking mechanism 82 for picking cards from the card cassette 44. The mechanism 82 includes a picking arm 84 that is pivotally mounted on the support structure 16 for pivoting movement about an axis B parallel to the guide posts 24*a,b* toward and away from the card cassette 44. The picking arm is pivotable between a first, vertical disengaged position (shown in FIGS. 1–4) and a second, feed position (not shown) in which a card is picked by the picking mechanism 82. The picking arm 84 is preferably driven by a stepper motor 86 which is drivingly engaged with the picking arm in any suitable manner, such as by a belt 88 and pulley 90 arrangement.

A picking finger 92 is attached to the end of the picking arm 84 and extends horizontally therefrom toward the card cassette 44. As best seen in FIGS. 1 and 4, the picking arm 92 preferably includes a narrow front portion 94, a thickened back portion 96, and an angled shoulder 98 defined at the juncture of the front and back portions 94,96. The picking arm and picking finger are located and sized such that when the picking arm pivots toward the second, feed position, the picking finger 92 will extend between the stop bar 62 and the plate member 50 to thereby allow the picking finger 92 to engage against the end of one of the cards 14. As the picking finger 92 pivots toward the second position, the narrow front portion 94 will extend along the side surface of the card to be picked and the angled shoulder 98 will engage against the end of the card. The card is then pushed by the finger 92 from the slots 54 and out the opposite side of the card cassette 44. Prior to the pivoting of the picking arm 84, the gate mechanism 64 must be pivoted to the second position thereof to allow the picked card to exit through the side of the card cassette 44.

Turning now to FIGS. 3 and 4, a pair of driven feed rollers 100*a*,100*b* are mounted on the side plate 22, with the nip between the rollers 100*a,b* aligned with the picking finger 92 such that a card 14 being pushed out of the card cassette 44 by the picking mechanism 82 will enter the nip of the feed rollers and be driven thereby into the printer 12 for subsequent printing and/or embossing operations on the picked card. The feed rollers 100*a,b* are preferably rotatably driven by a stepper motor 102 mounted on the base plate 18, with the stepper motor being drivingly connected to the feed rollers in any suitable manner, such as through a drive belt 104 and pulley 106 arrangement.

A sensor assembly 108 is mounted on the support structure 16 between the picking arm 84 for sensing the cards 14 as the card cassette 44 is moved back and forth. The sensor assembly 108 is positioned between the stop bar 62 and the plate member 48 such that the bottom ends of the cards 14 are sensed. The sensor assembly 108 is able to sense the edge of each individual card 14 due to the discrete position of each card in which the cards are spaced apart, and thereby provide an indication of the location of the cards within the card cassette. As stated previously, the dividers 56 include cut-outs 58*a,b* as well as a central portion 60 that is disposed behind the stop bar 62. Due to the cut-outs 58*a,b*, the sensor assembly 108 does not detect the dividers 56 and instead interprets the positions of the dividers as open spaces. Further, any pair of aligned grooves 54 that do not have either a card 14 or a divider 56 therein is also interpreted as an open position. Thus the position of the cards within the card cassette 44 can be determined by initially bringing the card cassette to a home position, and then moving the card cassette past the sensor assembly 108 to sense the contents of the card cassette. The information pertaining to the card locations can then be used to create a map of the card positions within the card cassette.

If desired, information pertaining to the positions of the cards and particular card types as they were originally loaded into the card cassette can be provided to a host controller 110. The card cassette can then be homed and scanned by the sensor assembly to thereby provide a detailed inventory map of card position and card type. Instead of providing card type information to the host controller, each individual card could be provided with a marker that is sensed by the sensor assembly 108, with the marker on each card relating to the particular card type. In this manner, the particular card types, as well as the position of the cards, could be sensed by the sensor assembly and transmitted to the host for creating the inventory map. By utilizing a marker on each card, the dividers 56 could be eliminated and the different card types could be intermingled in the card cassette, since the host controller would have a detailed map of both card type and card position that could then be utilized to pick the desired card.

Further, as a particular card is picked and fed to the printer 12, the inventory map within the host controller could be updated to reflect the particular card type, as well as the card position, that was just picked, to thereby provide an updated inventory of the cards remaining in the card cassette. When it is desired to remove the card cassette 44 and/or add more cards to the card cassette, a final scan of the card cassette could be performed to thereby provide a final inventory of the cards remaining in the card cassette. This ability to create a card inventory, as well as track the instantaneous card inventory, increases the security of the card feeder 10 by keeping track of the cards 14 and detecting if the card cassette is missing any card(s) that has not been picked, and the creation of an inventory is especially appealing when the card cassette is to be distributed to an unattended kiosk.

Figure 5:
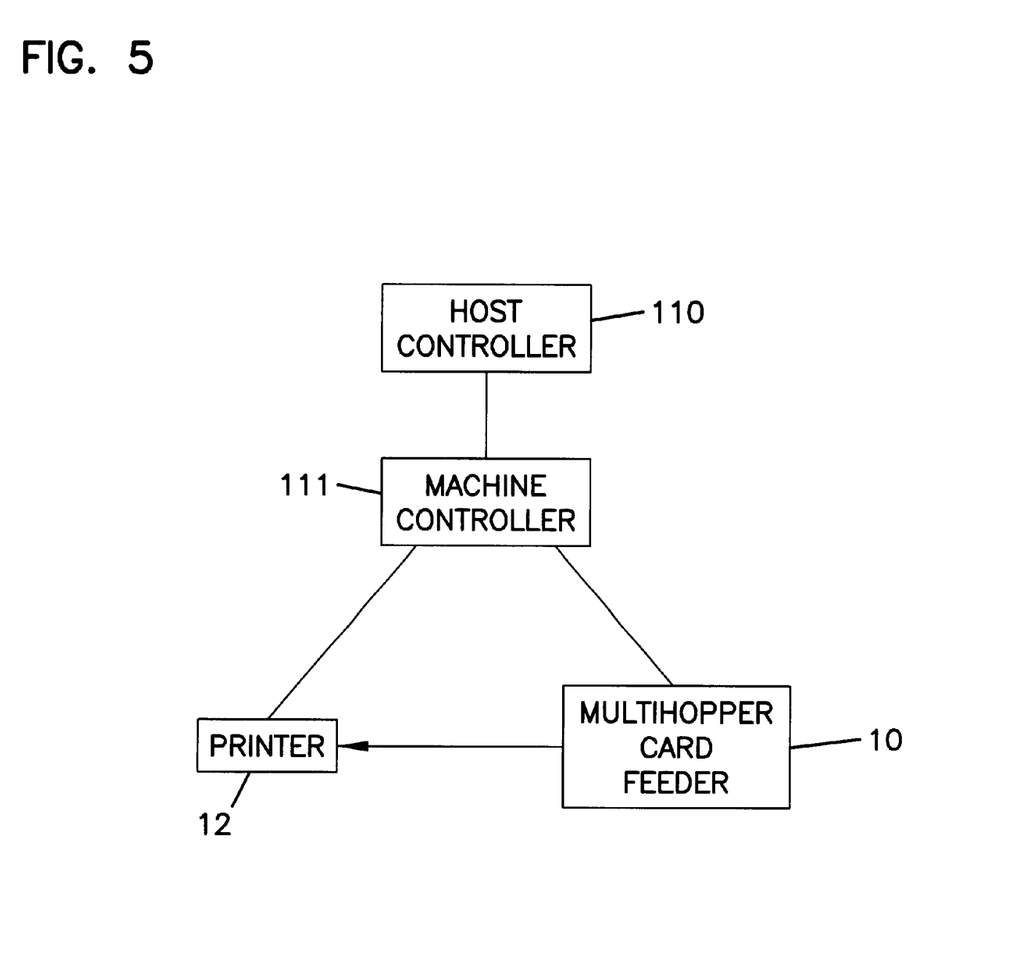
FIG. 5 is a diagrammatic illustration of the multihopper card feeder and printer controlled by a common controller.

The operation of the card feeder 10 as well as the operation of the printer 12, are preferably controlled by a machine controller 111 within the card issuance kiosk, which in turn is controlled by the host controller 110, as shown diagrammatically in FIG. 5. The machine controller 111 is preferably programmed to control operation of the various stepper motors 30, 86, 102 of the card feeder, as well as controlling operation of the printer, in addition to reporting on the status of the card inventory to the host controller 110.

Figure 6:
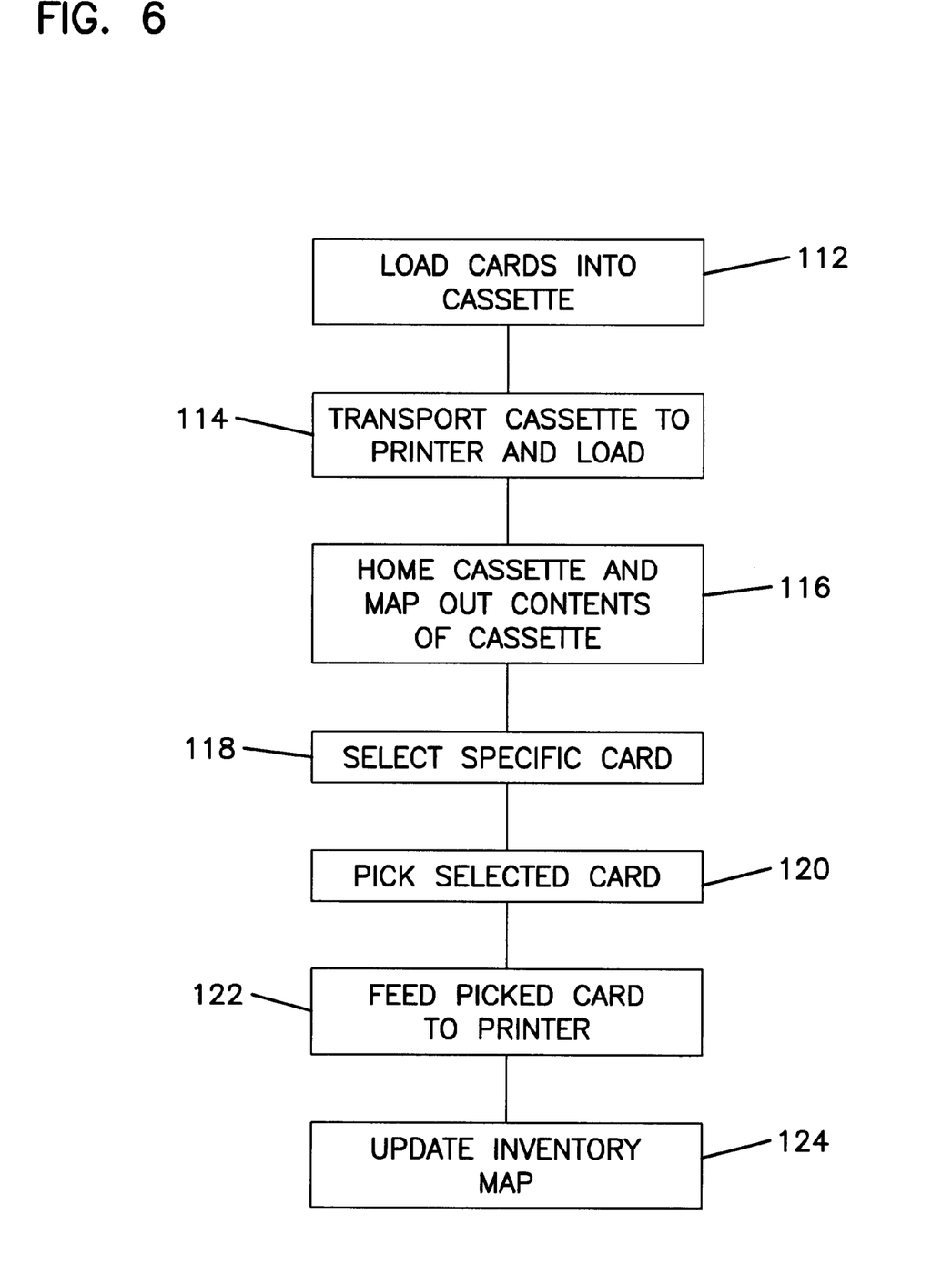
FIG. 6 is a flow diagram of the process steps in accordance with the present invention.

The process for operating the card feeder 10 so as to feed cards into the printer 12 will now be described with reference to FIG. 6, along with FIGS. 1–4. Assuming that the card cassette 44 is initially empty and removed from the card feeder 10, the cards are loaded into the cassette at step 112, either with dividers 56 between each of the card types to thereby divide the cassette into a plurality of hoppers, or without dividers in which case each card would have a marker associated therewith that is detectable by the sensor assembly. As explained above, information pertaining to card type and position of the initially loaded card cassette can be provided to the host controller for use in creating the inventory map, which helps ensure that cards are not stolen after loading into the card cassette, since the initial scan of the card cassette would detect any alteration of the initial inventory map.

After the cards are loaded into the card cassette, the cassette 44 is transported to the location of the printer 12 and loaded onto the carriage 36, at step 114, by disposing the locating pins 46 in the locating slot 47 and locating hole in the end plates 52a,52b. Once the cassette is properly loaded, the gate mechanism 64 is manually pivoted to the second position and locked in position. Although the gate mechanism is described herein as being manually actuated, the pivoting movements of the gate mechanism could be automated and controlled by the machine controller 111 if desired.

After the cassette is loaded and the gate mechanism is opened, the cassette 44 is moved to a home position and then moved past the sensor assembly from the home position to map out the contents of the cassette at step 116. The sensor assembly 108 scans all the discrete positions defined by the grooves, sensing either the presence or absence of a card, and transmitting this information to the host controller. As described previously herein, if dividers are used they are not detected by the sensor assembly and instead their position is considered to be an open space. If dividers are not used and each card instead has a marker thereon that is detectable by the sensor assembly, the different card types can be freely intermingled in the card cassette, since the marker on each card provides an indication of card type.

At step 118, the user of the card issuance kiosk, or any other system the card feeder 10 and printer 12 are used in, selects the desired card from a keypad or other user interface associated with the kiosk. The user's selection is transmitted to the host controller 110, which then commands the selection of the specific card to be picked from the cassette 44. The card to be picked and its location within the card cassette are determined by the inventory map. At the same time that the host controller 110 is commanding the selection of the specific card, the host controller is sending information, via the machine controller 111, to the printer 12 relating to the personalization information that is to be printed and/or embossed onto the card. The personalization information, such as the users name and address, are entered by the user using the same user interface that was used to enter the card type.

Thereafter, at step 120, the specific card is picked by the picking mechanism 82. In order to pick the correct card, the stepper motor 30 is actuated to move the carriage and card cassette to the proper position by sensing the correct card and/or actuating the motor 30 a predetermined number of steps in order to reach the correct card. Once the proper position is reached, the stepper motor 86 is actuated to pivot the picking arm 84 thereby causing the picking finger 92 to engage the correct card and push it from the cassette.

At step 122, the card that has been picked is then fed by the feed rollers 100a,b to the printer 12 to be printed and/or embossed with the personalization information. Once the picked card is engaged by the feed rollers, the picking arm 84 can be pivoted back to the initial position to allow further movement of the card cassette and subsequent picking of additional cards. Further, once the card is picked, the inventory map in the host controller 110 can be updated at step 124 to provide an updated inventory of the cards remaining within the card cassette.

The card cassette has been described herein as being a rectangular structure that moves along a linear path. However, other card cassette configurations are possible. For instance, a circular card cassette similar to that used in connection with a slide projector could be utilized. The circular card cassette would be rotatable, instead of linearly moveable, and would have spaced plate members, similar to the plate members 48,50, having a plurality of aligned grooves or slots therein such that the cards would be circumferentially spaced about the circular card cassette. Further, multiple card cassettes, either of the same or different type, could be utilized in a side-by-side arrangement or stacked, with a sensing mechanism provided to sense the different cassette types. These alternate cassette configurations would allow an increase in capacity, as well as conforming to available space.

Further, a mechanism similar to the card feeder 10 could be utilized at the output of a printer to receive and store personalized cards for later processing or distribution. As an added security measure, the cassette could include a locking mechanism to secure the contents of the cassette, or the cassette could include a mechanism to detect and/or test for potential tampering of cassette contents. Further, the card cassette could be locked to the carriage for even more security. It is anticipated that the card cassette 44 could be loaded using an automated loading mechanism, thereby eliminating the need to load the cassette by hand.

Finally, while the card cassette 44 has been shown and described herein as being loaded through a particular side, as well as the cards exiting through the same side, the cassette could be configured for loading through the opposite side. Further, the cassette is described as being loaded onto the carriage 36 from above. However, the card feeder 10 could be reoriented such that the card cassette is loaded onto the carriage from the front or sides, rather than from the top.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A multihopper card feeder, comprising:

a support structure, a carriage movably mounted on said support structure;

a card cassette detachably mounted on said carriage for holding a plurality of cards, said card cassette being moveable relative to said support structure, said card cassette defining a discrete position for each card of the plurality of cards, and said card cassette includes first and second members spaced apart from each other, each of said first and second members including a plurality of spaced grooves defined therein, said grooves being sized to receive first and second edges of the cards herein, the grooves in said first member being aligned with the grooves in said second member, and each said discrete position being defined by a respective pair of the aligned grooves, and said card cassette further includes a discharge side through which he cards are discharged from said card cassette;

at least one divider removably disposed within a pair of the aligned grooves of the first and second members to thereby divide the card cassette into a plurality of sections; and a card picker mounted on said support structure, said card picker capable of picking any one of the plurality of cards from said card cassette, and said card picker is disposed on the side of the card cassette opposite the discharge side.

2. The multihopper card feeder according to claim 1, wherein a plurality of said dividers are disposed within respective pairs of the aligned grooves.

3. An apparatus for holding a plurality of cards and feeding the cards to a printer, comprising:

a support structure connected to the printer;

a card cassette mounted on said support structure, said card cassette being moveable relative to said support structure, said card cassette defining a discrete position for each card of the plurality of cards, and said card cassette includes a first set of spaced grooves and a second set of spaced grooves separated from the first set, the grooves of said first set being aligned with the grooves of said second set, and the grooves of said first and second sets being sized so as to slideably receive opposite edges of the cards therein;

at least one divider for dividing the cards into different groups, said divider being removably disposed within a pair of the aligned grooves of the first and second set;

a mechanism mounted on the cassette controlling ingress of cards to and egress of cards from the cassette;

a card picker mounted on said support structure for picking any one of the plurality of cards from said card cassette; and feed rollers engageable with each card picked by said card picker for feeding each picked card to tile printer, said feed rollers and said card picker are disposed on opposite sides of the card cassette.

4. A process for feeding cards into a printer, comprising:

loading a plurality of the cards into a cassette, with each card having a discrete position;

loading the cassette into the printer;

mapping out the position of each card in the cassette to thereby create an inventory map;

picking a selected one of the plurality of cards from the cassette; and feeding the picked card to the printer.

5. The process according to claim 4, wherein the step of loading a plurality of cards comprises loading different types of cards into the cassette.

6. The process according to claim 4, wherein the cassette includes a plurality of slots, and the step of loading comprises loading the plurality of cards into the slots.

7. The process according to claim 6, wherein the step of mapping out the position comprises scanning all the slots.

8. The process according to claim 4, further comprising updating the inventory map.

* * * * *